United States Patent
Zink

(10) Patent No.: US 8,381,861 B2
(45) Date of Patent: Feb. 26, 2013

(54) POWER TRANSFER UNIT WITH DUAL HYPOID GEARTRAIN

(75) Inventor: Frederick E. Zink, Capac, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 856 days.

(21) Appl. No.: 12/401,787

(22) Filed: Mar. 11, 2009

(65) Prior Publication Data

US 2009/0235780 A1 Sep. 24, 2009

Related U.S. Application Data

(60) Provisional application No. 61/038,181, filed on Mar. 20, 2008.

(51) Int. Cl.
*B60K 17/34* (2006.01)
(52) U.S. Cl. .......................... 180/233; 180/245; 180/248
(58) Field of Classification Search .................. 180/233, 180/245, 248; 74/665 A, 665 B; 475/230, 475/231, 233
See application file for complete search history.

(56) References Cited

U.S. PATENT DOCUMENTS

| | | | | |
|---|---|---|---|---|
| 838,604 A * | 12/1906 | Bard | | 180/261 |
| 1,210,754 A * | 1/1917 | Beatty | | 180/257 |
| 2,262,710 A * | 11/1941 | Lang | | 475/198 |
| 3,580,350 A * | 5/1971 | Arkus-Duntov | | 180/248 |
| 3,939,936 A * | 2/1976 | Vinton | | 180/233 |
| 4,405,029 A | 9/1983 | Hunt | | |
| 4,605,087 A * | 8/1986 | Ashauer et al. | | 180/248 |
| 4,618,022 A * | 10/1986 | Hayashi | | 180/249 |
| 4,650,202 A * | 3/1987 | Tsuzuki | | 180/248 |
| 4,693,334 A * | 9/1987 | Hiraiwa | | 180/249 |
| 4,765,433 A * | 8/1988 | Fujii et al. | | 180/244 |
| 4,865,396 A * | 9/1989 | Sato | | 303/113.5 |
| 5,078,229 A * | 1/1992 | Kikuchi et al. | | 180/248 |
| 5,107,951 A * | 4/1992 | Kawamura | | 180/248 |
| 5,143,167 A * | 9/1992 | Moriyama et al. | | 180/248 |
| 5,146,801 A | 9/1992 | Oda | | |
| 5,348,516 A * | 9/1994 | Shibata | | 475/206 |
| 5,351,782 A * | 10/1994 | Kameda | | 180/297 |
| 5,966,999 A | 10/1999 | Showalter et al. | | |
| 6,135,229 A * | 10/2000 | Arimatsu | | 180/248 |
| 6,158,303 A | 12/2000 | Shiraishi et al. | | |
| 6,244,126 B1 * | 6/2001 | Brooks | | 74/423 |
| 6,655,488 B2 * | 12/2003 | Braud | | 180/233 |
| 6,719,656 B2 | 4/2004 | Bowen | | |
| 6,834,738 B2 | 12/2004 | Kobayashi | | |
| 2003/0060321 A1 | 3/2003 | Greil | | |
| 2006/0113125 A1 * | 6/2006 | Ima | | 180/22 |
| 2006/0199697 A1 | 9/2006 | Kirkwood et al. | | |
| 2006/0243512 A1 * | 11/2006 | Grabmaier et al. | | 180/242 |
| 2011/0087410 A1 * | 4/2011 | Cimatti et al. | | 701/60 |

* cited by examiner

*Primary Examiner* — Anne Marie Boehler
*Assistant Examiner* — Maurice Williams
(74) *Attorney, Agent, or Firm* — Harness, Dickey & Pierce, P.L.C.

(57) ABSTRACT

A transfer case for use in motor vehicles for transferring drive torque from a powertrain to first and second drivelines includes a first output shaft adapted to transmit drive torque from the powertrain to the first driveline. The second output shaft is adapted to transmit drive torque to a second driveline. The transfer case includes a first spiral bevel gear set driven by the first output shaft and a second spiral bevel gear set driven by the first spiral bevel gear set and driving the second output shaft.

31 Claims, 6 Drawing Sheets

POWER TRANSFER UNIT WITH DUAL HYPOID GEARTRAIN

CROSS-REFERENCE TO RELATED APPLICATIONS

This application claims the benefit of U.S. Provisional Application No. 61/038,181, filed on Mar. 20, 2008. The entire disclosure of the above application is incorporated herein by reference.

BACKGROUND

The present disclosure relates generally to four-wheel drive motor vehicles and, more particularly, to a transfer case equipped with a dual spiral bevel gear arrangement.

In view of increased demand for four-wheel drive vehicles, many different power transfer systems are currently being incorporated into vehicular drivetrain applications for transferring drive torque to all four wheels. In some vehicles, a transfer case is interconnected between primary and secondary drivelines. The transfer case may be equipped with a dog-type mode clutch that can be selectively engaged for rigidly coupling the secondary driveline to the primary driveline to establish a part-time, four-wheel drive mode. When the mode clutch is disengaged, all drive torque is delivered to the primary driveline for establishing a two-wheel drive mode.

Many existing transfer cases are equipped with a rear output shaft extending parallel to a front output shaft. A first sprocket may be coupled to the rear output shaft while a second sprocket is coupled to the front output shaft. A chain drivingly interconnects the first and second sprockets to transfer power between the front and rear output shafts. While the sprocket and chain arrangements have functioned generally satisfactorily in the past, it may be desirable to provide an alternate power transfer mechanism that may be stronger, lighter and smaller than existing designs.

SUMMARY

The present disclosure relates to a transfer case for use in motor vehicles for transferring drive torque from a powertrain to first and second drivelines. The transfer case includes a first output shaft adapted to transmit drive torque from the powertrain to the first driveline. The second output shaft is adapted to transmit drive torque to a second driveline. The transfer case includes a first spiral bevel gear set driven by the first output shaft and a second spiral bevel gear set driven by the first spiral bevel gear set and driving the second output shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
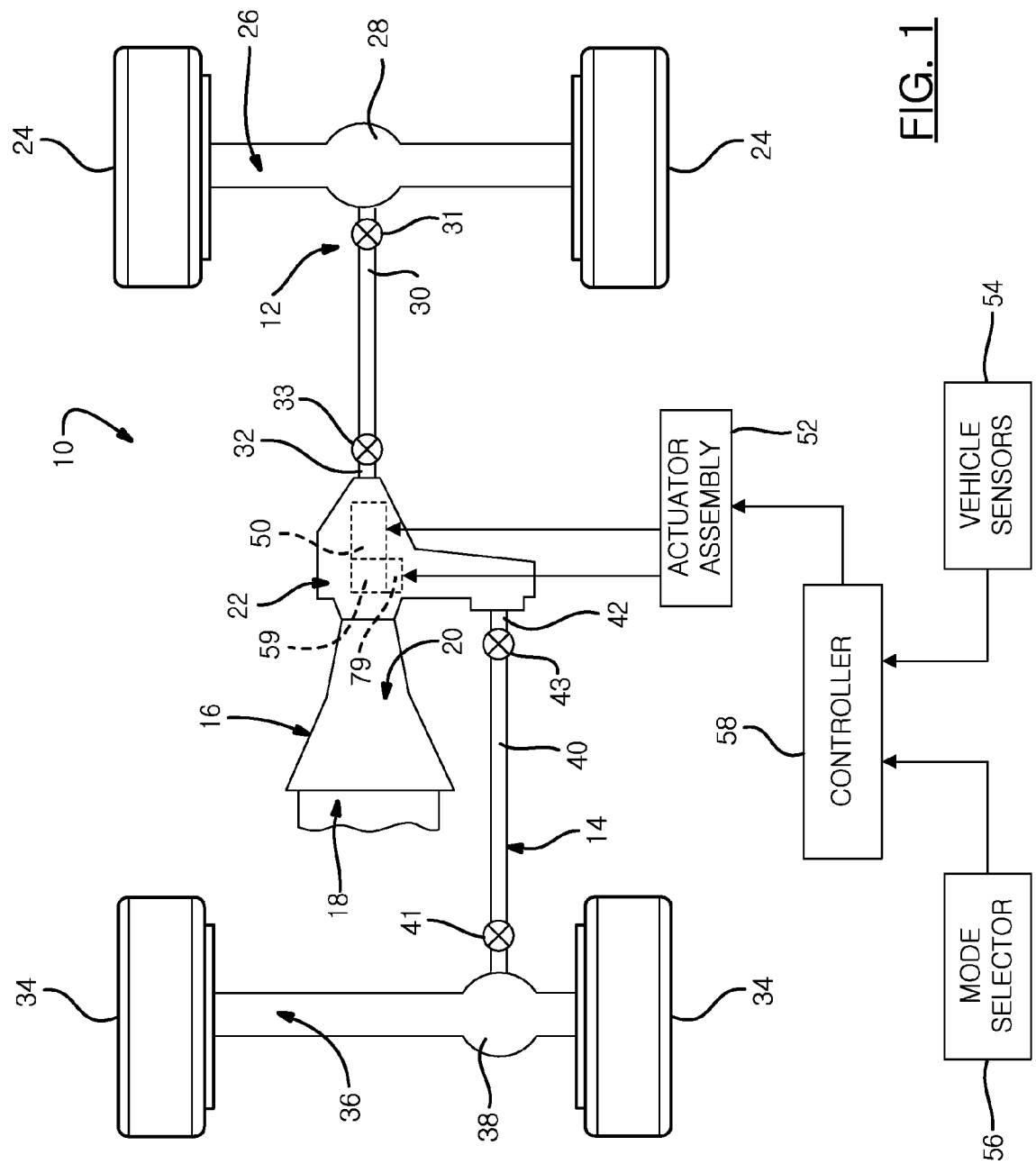
FIG. 1 is a schematic illustrating a drivetrain of a four-wheel drive motor vehicle equipped with a transfer case of the present disclosure.

The following description is merely exemplary in nature and is not intended to limit the present disclosure, application, or uses. It should be understood that throughout the drawings, corresponding reference numerals indicate like or corresponding parts and features.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e. drive torque) to the drivelines. In the particular arrangement shown, primary driveline 12 is the rear driveline while secondary driveline 14 is the front driveline. Powertrain 16 includes an engine 18, a multi-speed transmission 20, and a transfer case 22. Rear driveline 12 includes a pair of rear wheels 24 connected at opposite ends of a rear axle assembly 26 having a rear spiral bevel gear set 28 coupled to one end of a rear prop shaft 30 by a universal joint 31. Rear spiral bevel gear set 28 may form a part of a rear differential. The opposite end of rear prop shaft 30 is coupled to a rear output shaft 32 of transfer case 22 by a universal joint 33. Front driveline 14 includes a pair of front wheels 34 connected at opposite ends of a front axle assembly 36 having a front spiral bevel gear set 38 coupled to one end of a front prop shaft 40 by a universal joint 41. Front spiral bevel gear set 38 may be part of a front differential if desired. The opposite end of front prop shaft 40 is coupled to a front output shaft 42 of transfer case 22 by a universal joint 43.

Drivetrain 10 is shown to further include an electronically-controlled power transfer system for permitting a vehicle operator to select between a two-wheel drive mode, a part-time four-wheel drive mode, and an on-demand four-wheel drive mode. In this regard, transfer case 22 is equipped with a transfer clutch 50 that is operable for transferring drive torque from rear output shaft 32 to front output shaft 42 for establishing the part-time and on-demand four-wheel drive modes. The power transfer system further includes a power-operated actuator assembly 52 for actuating transfer clutch 50, vehicle sensors 54 for detecting certain dynamic and operational characteristics of the motor vehicle, a mode selector 56 for permitting the vehicle operator to select one of the available drive modes, and a controller 58 for controlling actuation of actuator assembly 52 in response to input signals from vehicle sensors 54 and mode selector 56.

Transfer clutch 50 may be operated to selectively transfer torque between rear output shaft 32 and front driveline 14. When mode selector 56 signals selection of the two-wheel drive mode, transfer clutch 50 does not transfer torque from rear output shaft 32 and all of the drive torque is delivered by powertrain 16 to rear driveline 12. In contrast, when either of the part-time or on-demand four-wheel modes is selected, transfer clutch 50 is operable to transfer drive torque from rear output shaft 32 to front output shaft 42 and front driveline 14.

Transfer case 22 may also be optionally equipped with a gear reduction unit 59 as shown in FIG. 1. Gear reduction unit 59 is operable to provide at least two different gear ratios such that transfer case 22 may be operable in a high gear range and a low gear range. A neutral gear may also be provided. In one arrangement, gear reduction unit 59 is a planetary gearset providing an output drive ratio of 1:1 in the high range mode and a speed reduction in the low range mode. Any number of low gear ratios may be provided depending on the particular planetary gearset implemented.

Figure 2:
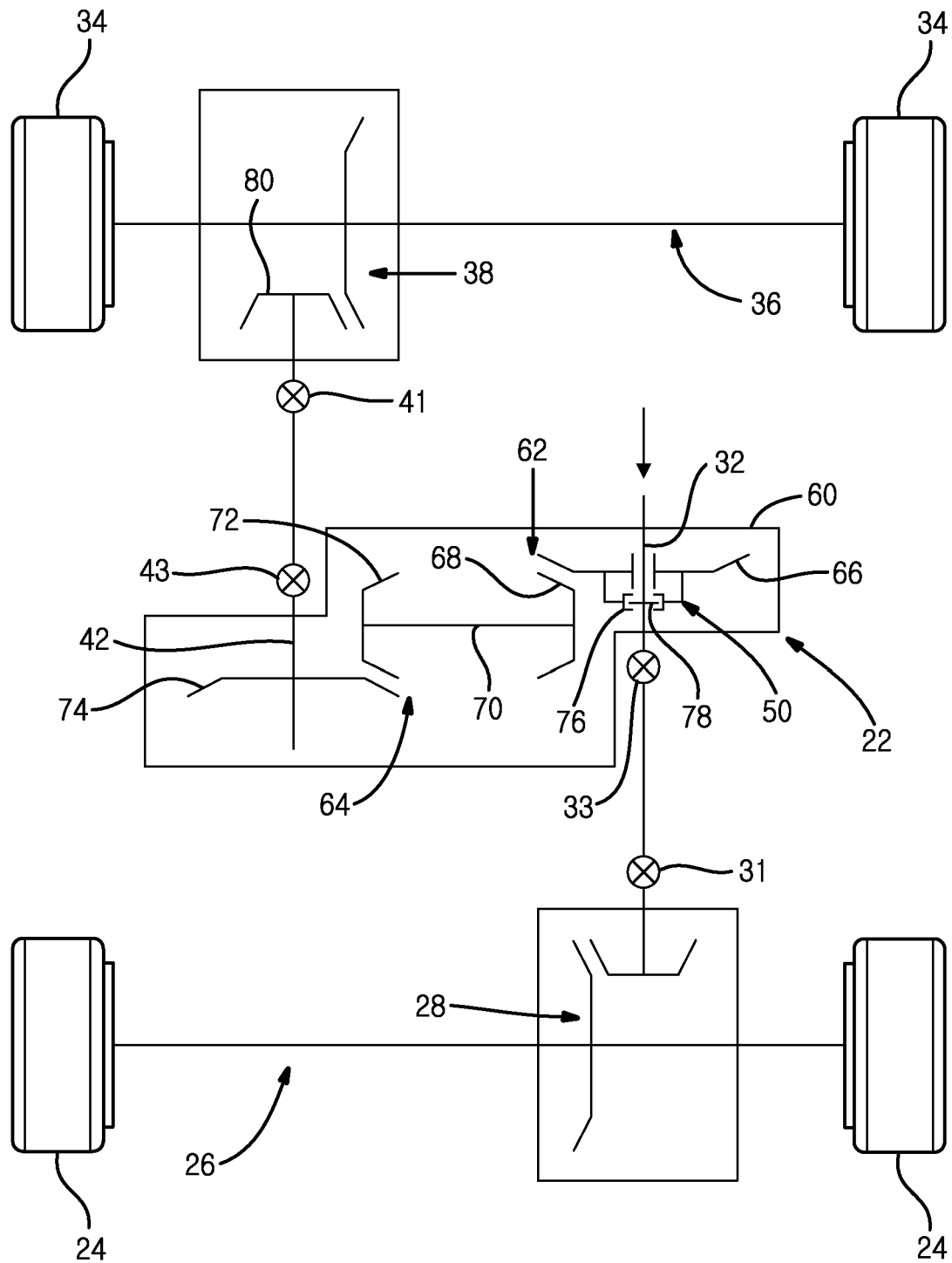
FIG. 2 is a schematic depicting a transfer case having a dual hypoid geartrain.

Referring primarily to FIG. 2, transfer case 22 is shown to include a housing 60 adapted to be bolted to the housing of transmission 20. Rear output shaft 32 and front output shaft 42 are rotatably supported by housing 60. Transfer case 22 also includes a first hypoid gear set 62 and a second hypoid gear set 64 drivingly interconnected to one another. First hypoid gear set 62 includes a first ring gear 66 and a first pinion gear 68. First pinion gear 68 is fixed to a pinion shaft 70. First ring gear 66 is rotatably supported on rear output shaft 32. First ring gear 66 may be selectively drivingly coupled to rear output shaft 32 by actuation of transfer clutch 50. Vehicular operation in the various two and four-wheel drive modes as well as operation of transfer clutch 50 will be described in greater detail hereinafter. It should be appreciated that transfer case 22 need not be mounted to transmission 20 but may be spaced apart from engine 18 and transmission 20. Furthermore, while certain gear sets may be referred to as "hypoid gear sets," it is contemplated that spiral bevel gear sets in general are within the scope of the present disclosure where a hypoid gear set is a particular type of spiral bevel gear set having an offset between the pinion centerline and the ring gear centerline.

Second hypoid gear set 64 includes a second pinion gear 72 fixed for rotation with pinion shaft 70. It should be appreciated that first pinion gear 68, pinion shaft 70 and second pinion gear 72 may be formed as a one-piece member or may alternatively be constructed from two or more sections. If two or more sections are interconnected to one another, it is contemplated that bearings (not shown) may be positioned about pinion shaft 70 prior to one of first pinion gear 68 and second pinion gear 72 being fixed to pinion shaft 70. In another alternate arrangement, pinion shaft 70 may be initially separated into two or more pieces and subsequently coupled to the others to facilitate assembly. Second pinion gear 72 is in driving engagement with a second ring gear 74. Second ring gear 74 is fixed for rotation with front output shaft 42.

Transfer clutch 50 may be a mechanically-actuated, multiplate clutch assembly having a drum 76 fixed for rotation with first ring gear 66. A plurality of outer clutch plates (not shown) are drivingly engaged with drum 76. A hub 78 is fixed for rotation with rear output shaft 32. A plurality of inner clutch plates (not shown) are placed in splined engagement with hub 78 and interleaved with the outer clutch plates. Actuator assembly 52 is operable to selectively apply a force to engage the inner and outer plates to cause torque to transfer between rear output shaft 32 and first ring gear 66. The quantity of torque transferred to first hypoid gear set 62 may be varied by controlling the magnitude of force applied by actuator assembly 52. Actuator assembly 52 may also control a range clutch 79 operable to shift reduction gear set 59 between the high and low range modes of operation. A separate actuator may be used if desired.

In the arrangement depicted in FIG. 2, first ring gear 66 is formed having a right-hand spiral in driving engagement with first pinion gear 68 having a left-hand spiral. Second pinion gear 72 is formed with a left-hand spiral drivingly engaging second ring gear 74 formed having a right-hand spiral. Based on the relative positioning of the gears and the direction of the spiral, each of the gears within first hypoid gear set 62 and second hypoid gear set 64 engage one another to load a convex surface or side of the ring gear teeth when the vehicle is being driven in a forward direction. This arrangement may be advantageous because transferring torque through the gears of hypoid gear sets on the convex surface or side of the ring gear teeth results in a more robust power transfer because the gears are stronger in this drive direction. Furthermore, noise vibration and harshness generated by the hypoid gear set is reduced when transferring power through the gear sets in this direction.

The relative arrangement of gears that allows the convex side of the ring gears to be contacted is shown in FIG. 2 and includes positioning first ring gear 66 longitudinally forward of first pinion gear 68 and positioning second ring gear 74 rearward of second pinion gear 72. With this gear arrangement, front prop shaft 40 may be longer than other arrangements to allow a greater axial offset between front output shaft 42 and a front pinion gear 80 of front hypoid gear set 38. As the length of front prop shaft 40 is increased, the angle of articulation of universal joints 41 and 43 decreases.

Figure 3:
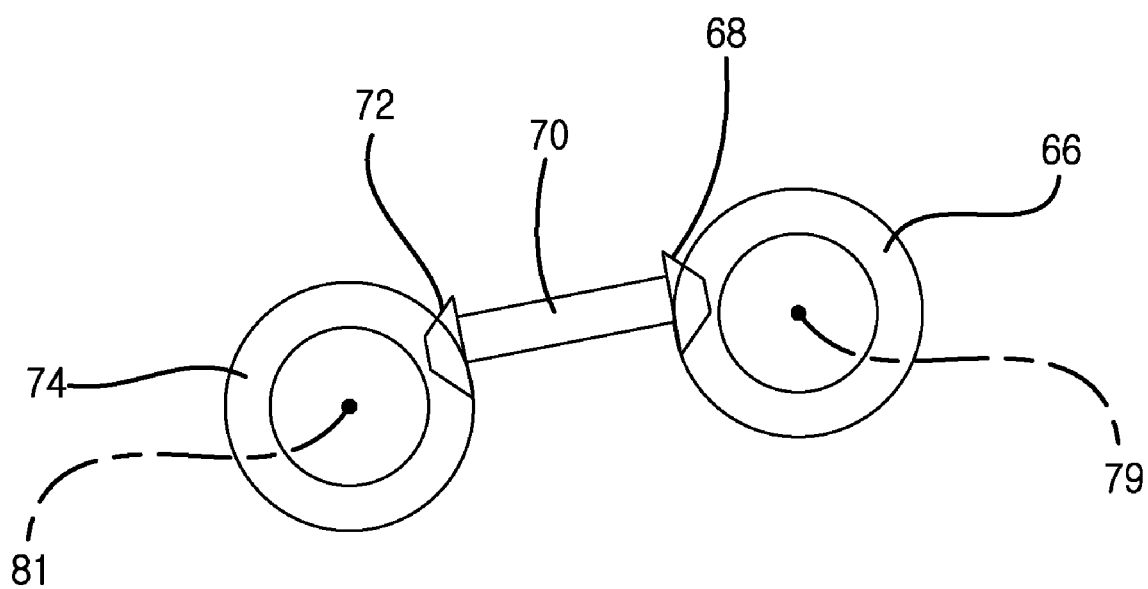
FIG. 3 is an end view of a dual hypoid geartrain arrangement.

FIG. 3 depicts an end view of first hypoid gear set 62 and second hypoid gear set 64. First ring gear 66 has an axis of rotation 79 positioned further from the ground than an axis of rotation 81 of second ring gear 74. First pinion gear 68 meshes with first ring gear 66 at approximately the 9 o'clock position. Second pinion gear 72 meshes with second ring gear 74 at approximately the 2 o'clock position.

Figure 4:
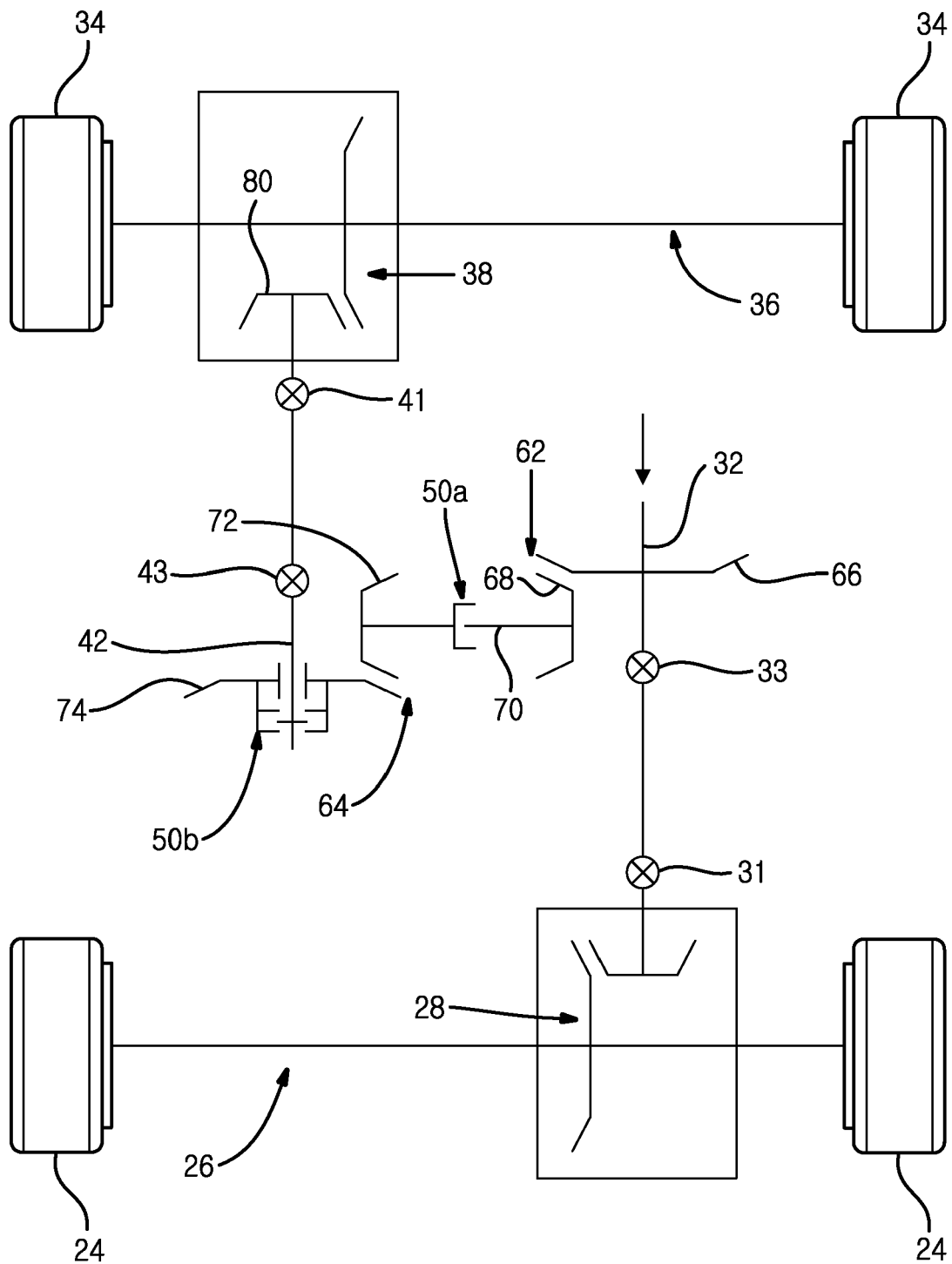
FIG. 4 is a schematic depicting alternative driveline clutch and differential positions.

FIG. 4 depicts an alternate location for a transfer clutch identified as 50a. If transfer clutch 50a is positioned to selectively transfer torque from first pinion gear 68 to second pinion gear 72, then first ring gear 66 may be fixed to rear output shaft 32. In similar fashion, another alternate position of the transfer clutch is identified at reference numeral 50b. Transfer clutch 50b selectively interconnects with second ring gear 74 with front output shaft 42. In each of the embodiments, transfer clutch 50, 50a or 50b may be selectively actuated to transfer torque from rear output shaft 32 to front output shaft 42. Any one of the transfer clutch locations depicted may be utilized. Furthermore, a variety of other transfer clutch locations are also contemplated without departing from the scope of the present disclosure. For example, the transfer clutch may be positioned downstream of the front prop shaft 40 to selectively transfer torque from the front prop shaft 40 to front pinion gear 80. To minimize energy losses due to component rotation and gear interface sliding, it may be beneficial to position the transfer clutch at a relatively upstream location such as depicted in FIG. 2. When transfer clutch 50 is not engaged, torque transfers directly through rear output shaft 32 to rear axle assembly 26. First hypoid gear set 62 and second hypoid gear set 64 are not driven by engine 18.

Figure 5:
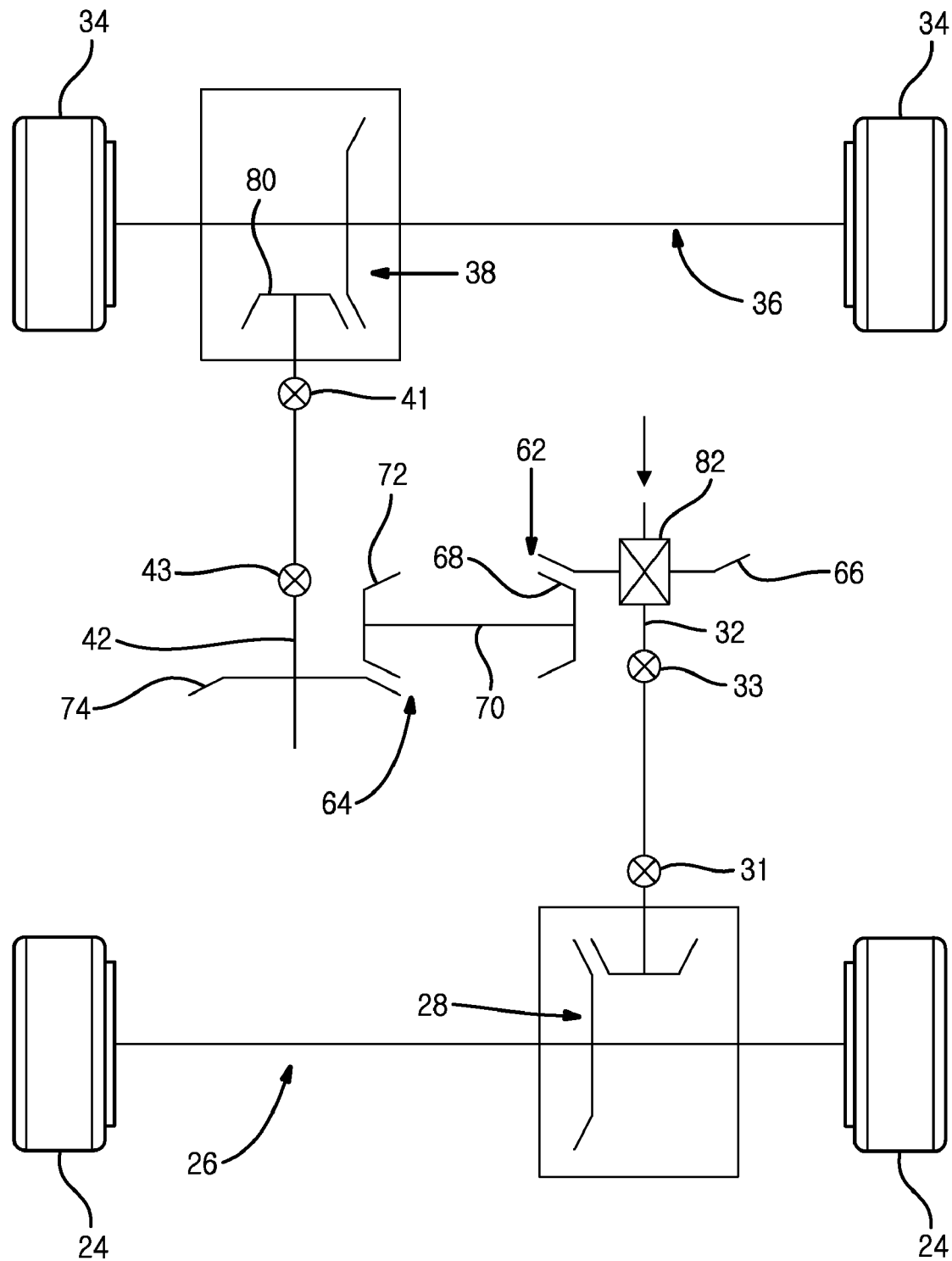
FIG. 5 is a schematic depicting another transfer case dual spiral bevel geartrain.

FIG. 5 also depicts an optional differential assembly 82 providing speed differentiation between front axle assembly 36 and rear axle assembly 26. Differential 82 may be incorporated to accommodate full-time or part-time four-wheel drive modes of operation. Differential 82 may be operable in a locked condition where no differentiation occurs. In on-demand usage situations, differential 82 need not be present. Furthermore, differential 82 need not be present in all configurations having full-time and part-time drive modes.

Differential 82 is operable to provide speed differentiation between a first output member and a second output member. In FIG. 5, the first output member is depicted as ring gear 66. However, it should be appreciated that the first output member may be any number of elements including a shaft, a member of a gear set or some other structure coupled to first ring gear 66. The second output member is depicted as rear output shaft 32 in the Figures. The second output member of differential 82 may alternatively be a shaft or a gear of a gear set adapted to provide torque to rear output shaft 32.

It should be appreciated that differential 82 may be constructed using bevel gears, helical gears, planetary gears or any number of power transmitting elements operable to provide speed differentiation between the first output member and the second output member.

Figure 6:
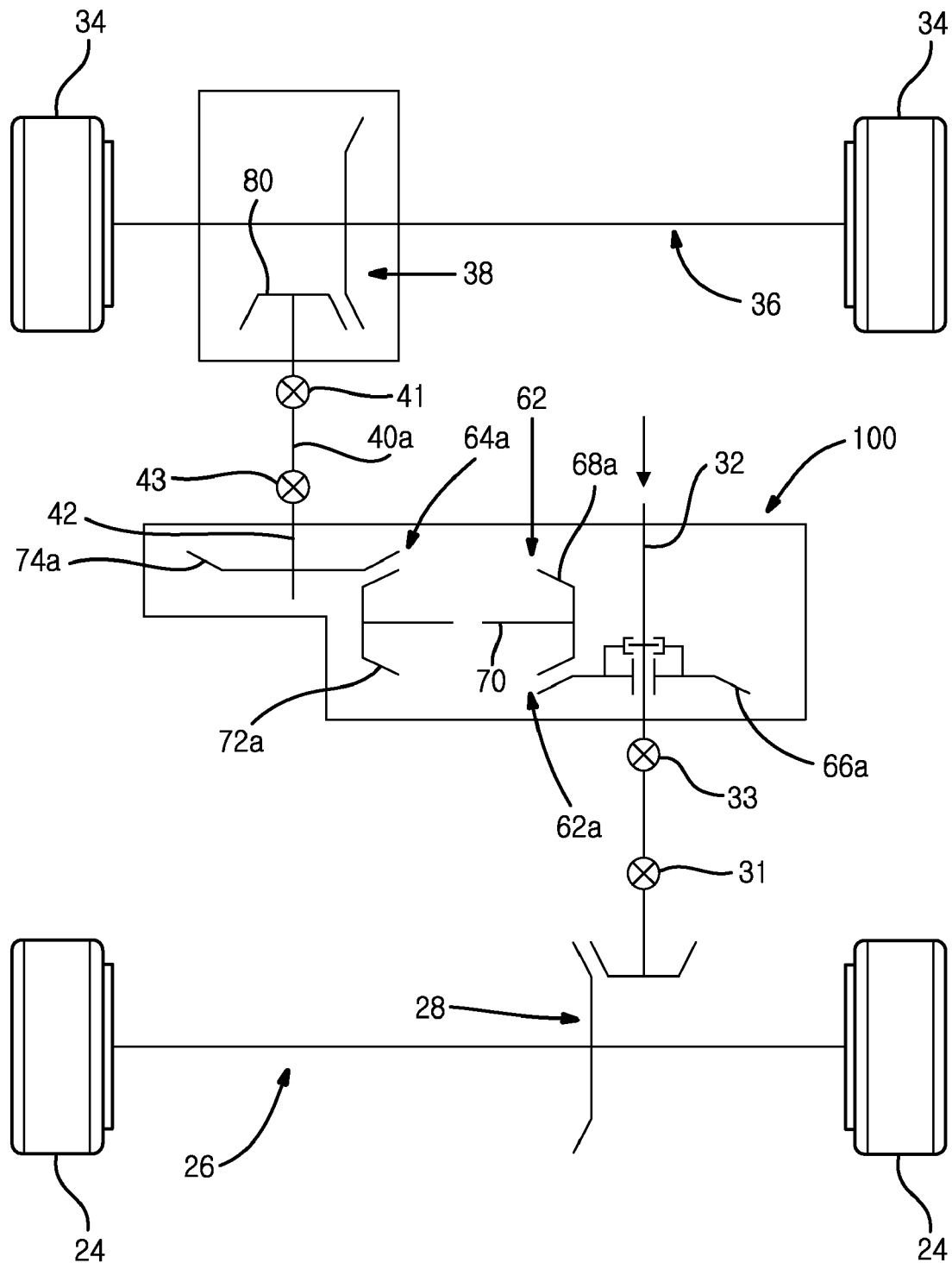
FIG. 6 is a schematic depicting another vehicle driveline arrangement.

FIG. 6 depicts an alternate driveline arrangement having a modified transfer case 100. Transfer case 100 is substantially similar to transfer case 22. Accordingly, like elements will retain their previously introduced reference numerals including a letter suffix. In particular, transfer case 100 includes first hypoid gear set 62a and a second hypoid gear set 64a. However, the hypoid gear sets are arranged differently compared to transfer case 22. Specifically, first hypoid gear set 62a includes a first ring gear 66a having a left-hand spiral formed thereon. A first pinion gear 68a is formed having a right-hand spiral in driving engagement with ring gear 66a. First ring gear 66a is positioned rearward of first pinion gear 68a.

Second pinion gear 72a is formed with a right-hand spiral and positioned in driving engagement with a second ring gear 74a having a left-hand spiral. Second ring gear 74a is positioned forward of second pinion gear 72a. In the driveline depicted in FIG. 4 including transfer case 100, front prop shaft 40a is shorter than the front prop shaft 40 shown in FIG. 2. A shorter prop shaft may prove to be beneficial because shorter shafts may typically be rotated faster than longer shafts when considering shaft deflection and/or whip during high speed rotation.

It should be noted that the gears within transfer case 100 are handed and positioned relative to one another to assure that power is transferred through the convex side of each ring gear during forward vehicle travel.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transfer case for use in motor vehicles for transferring drive torque from a powertrain to first and second drivelines, the transfer case comprising:
    an input shaft receiving drive torque from the powertrain;
    a first output shaft being driven by the input shaft and adapted to transmit the drive torque to the first driveline, wherein the input shaft rotates along a common axis with the first output shaft;
    a second output shaft adapted to transmit drive torque to the second driveline;
    a first spiral bevel gear set being driven by the first output shaft;
    a second spiral bevel gear set being driven by the first spiral bevel gear set, the second spiral bevel gear set driving the second output shaft; and
    a transfer clutch for transferring drive torque from said first output shaft to said second output shaft, the transfer clutch being positioned within a housing containing the first and second spiral bevel gear sets.

2. The transfer case of claim 1 wherein the transfer clutch selectively transfers torque between the first output shaft and a first ring gear of the first spiral bevel gear set.

3. The transfer case of claim 2 wherein the first ring gear is supported for rotation on the first output shaft.

4. The transfer case of claim 1 wherein a first ring gear of the first spiral bevel gear set is positioned longitudinally forward of a second ring gear of the second spiral bevel gear set.

5. The transfer case of claim 4 wherein a first pinion gear of the first spiral bevel gear set and a second pinion gear of the second spiral bevel gear set are each positioned longitudinally between the first and second ring gears.

6. The transfer case of claim 5 wherein the first and second ring gears are formed with a right-hand spiral and the first and second pinion gears are formed with a left-hand spiral.

7. The transfer case of claim 1 wherein the first spiral bevel gear set includes a first ring gear in continuous driving engagement with a first pinion gear.

8. The transfer case of claim 7 where the second spiral bevel gear set includes a second ring gear in continuous driving engagement with a second pinion gear.

9. The transfer case of claim 1 wherein the first spiral bevel gear set is in continuous driving engagement with the second spiral bevel gear set.

10. The transfer case of claim 9 wherein a first pinion gear of the first spiral bevel gear set and a second pinion gear of the second spiral bevel gear set are fixed for rotation with each other on a common pinion shaft.

11. The transfer case of claim 1 wherein the transfer clutch selectively transfers torque between a first pinion gear of the first spiral bevel gear set and a second pinion gear of the second spiral bevel gear set.

12. The transfer case of claim 1 wherein the transfer clutch selectively transfers torque between a second ring of the second spiral bevel gear set and the second output shaft.

13. The transfer case of claim 1 wherein gears of the first and second spiral bevel gear sets include handed spirals to simultaneously transfer torque through a convex surface of a first ring gear of the first spiral bevel gear set and a convex surface of a second ring gear of the second spiral bevel gear set.

14. The transfer case of claim 1 wherein a first ring gear of the first spiral bevel gear set is positioned longitudinally rearward of a second ring gear of the second spiral bevel gear set.

15. The transfer case of claim 14 wherein a first pinion gear of the first spiral bevel gear set and a second pinion gear of the second spiral bevel gear set are each positioned longitudinally between the first and second ring gears.

16. The transfer case of claim 15 wherein the first and second ring gears are formed with a left-hand spiral and the first and second pinion gears are formed with a right-hand spiral.

17. The transfer case of claim 1 further including a differential gear set providing speed differentiation between the first and second output shafts.

18. The transfer case of claim 1 wherein an axis of rotation of a first ring gear of the first spiral bevel gear set is positioned further from a ground surface over which the motor vehicles travel than an axis of rotation of a second ring gear.

19. The transfer case of claim 1 wherein the first and second spiral bevel gear sets are hypoid gear sets.

20. The transfer case of claim 1 further including a reduction speed gear set for providing two different output gear ratios between the input shaft and the first output shaft.

21. A transfer case for transferring drive torque from a powertrain to first and second drivelines, the transfer case comprising:
    an input shaft;
    a differential driven by the input shaft for transferring torque to a first output member and a second output member and providing speed differentiation therebetween;

a first output shaft driven by the second differential output member and adapted to transmit drive torque from the powertrain to the first driveline, wherein the input shaft rotates along a common axis with the first output shaft;

a second output shaft adapted to transmit drive torque to the second driveline;

a first spiral bevel gear set being driven by the first differential output member; and a second spiral bevel gear set being driven by the first spiral bevel gear set, the second spiral bevel gear set driving the second output shaft.

22. The transfer case of claim 21 further including a transfer clutch for transferring drive torque from said first output shaft to said second output shaft, the transfer clutch being positioned within a housing containing the first and second spiral bevel gear sets.

23. The transfer case of claim 21 wherein the first spiral bevel gear set is in continuous driving engagement with the second spiral bevel gear set.

24. The transfer case of claim 21 wherein a first pinion gear of the first spiral bevel gear set and a second pinion gear of the second spiral bevel gear set are fixed for rotation with each other on a common pinion shaft.

25. The transfer case of claim 21 wherein a power path formed by the transfer case includes transferring torque from the powertrain to a first ring gear of the first spiral bevel gear set, a first pinion gear of the first spiral bevel gear set, a second pinion gear of the second spiral bevel gear set and a second ring gear of the second spiral bevel gear set in sequence.

26. The transfer case of claim 21 wherein the first and second spiral bevel gear sets are hypoid gear sets.

27. The transfer case of claim 21 further including a reduction speed gear set for providing two different output gear ratios between the input shaft and the first output shaft.

28. A transfer case for use in motor vehicles for transferring drive torque from a powertrain to first and second drivelines, the transfer case comprising:

an input shaft receiving drive torque from the powertrain;

a first output shaft driven by the input shaft and adapted to transmit the drive torque to the first driveline, wherein the input shaft rotates along a common axis with the first output shaft;

a second output shaft adapted to transmit drive torque to the second driveline;

a first spiral bevel gear set driven by the first output shaft; and a second spiral bevel gear set driven by the first spiral gear set and driving the second output shaft;

wherein a first ring gear of the first spiral bevel gear set is positioned longitudinally with respect to a second ring gear of the second spiral bevel gear set, and wherein a first pinion gear of the first spiral bevel gear set and a second pinion gear of the second spiral bevel gear set are each positioned longitudinally between the first and second ring gears.

29. A transfer case for use in motor vehicles for transferring drive torque from a powertrain to first and second drivelines, the transfer case comprising:

an input shaft receiving drive torque from the powertrain;

a first output shaft driven by the input shaft and adapted to transmit the drive torque to the first driveline, wherein the input shaft rotates along a common axis with the first output shaft;

a second output shaft adapted to transmit drive torque to the second driveline;

a first spiral bevel gear set driven by the first output shaft; and a second spiral bevel gearset driven by the first spiral bevel gear set and driving the second output shaft;

wherein the first spiral bevel gear set is in continuous driving engagement with the second spiral bevel gear set, and wherein a first pinion gear of the first spiral bevel gear set and a second pinion gear of the second spiral bevel gear set are fixed for rotation on a common pinion shaft.

30. A transfer case for use in motor vehicles for transferring drive torque from a powertrain to first and second drivelines, the transfer case comprising:

an input shaft receiving drive torque from the powertrain;

a first output shaft driven by the input shaft and adapted to transmit the drive torque to the first driveline, wherein the input shaft rotates along a common axis with the first output shaft;

a second output shaft adapted to transmit drive torque to the second driveline;

a first spiral bevel gear set driven by the first output shaft;

a second spiral bevel gear set driven by the first spiral bevel gear set and driving the second output shaft; and a differential gear set providing speed differentiation between the first and second output shafts.

31. A transfer case for use in motor vehicles for transferring drive torque from a powertrain to first and second drivelines, the transfer case comprising:

an input shaft receiving drive torque from the powertrain;

a first output shaft driven by the input shaft and adapted to transmit the drive torque to the first driveline, wherein the input shaft rotates along a common axis with the first output shaft;

a second output shaft adapted to transmit drive torque to the second driveline;

a first spiral bevel gear set driven by the first output shaft;

a second spiral bevel gear set driven by the first spiral bevel gear set and driving the second output shaft; and a reduction speed gear set for providing two different output gear ratios between the input shaft and the first output shaft.

* * * * *